(No Model.)

F. W. J. HOOP & J. ISAAC.
BALING PRESS.

No. 387,516. Patented Aug. 7, 1888.

Witnesses.
L. T. Gardner
Allen S. Pattison

Inventors.
F. W. J. Hoop,
Jos. Isaac
per F. A. Lehmann, atty.

UNITED STATES PATENT OFFICE.

FRIEDRICH W. J. HOOP AND JOSEPH ISAAC, OF HOUSTON, TEXAS.

BALING-PRESS.

SPECIFICATION forming part of Letters Patent No. 387,516, dated August 7, 1888.

Application filed April 21, 1888. Serial No. 271,393. (No model.)

*To all whom it may concern:*

Be it known that we, FRIEDRICH W. J. HOOP and JOSEPH ISAAC, of Houston, in the county of Harris and State of Texas, have invented certain new and useful Improvements in Baling-Presses; and we do hereby declare the following to be a full, clear, and exact description of the invention, such as will enable others skilled in the art to which it pertains to make and use it, reference being had to the accompanying drawings, which form a part of this specification.

Our invention relates to an improvement in baling-presses; and the object of our invention is to provide a press in which the material to be baled can be compressed into bales of the desired sizes, and then emptied from the baling-box by tilting up the tail-board, which is provided with angle-irons to catch under the bale.

Figure 1:
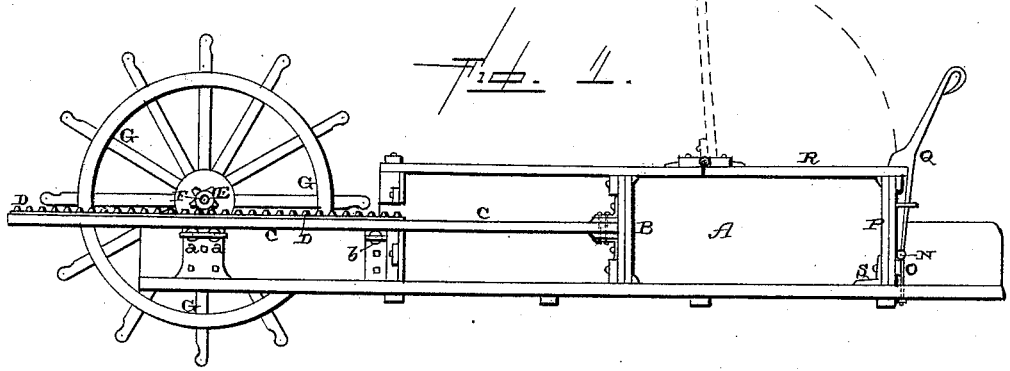
Figure 2:
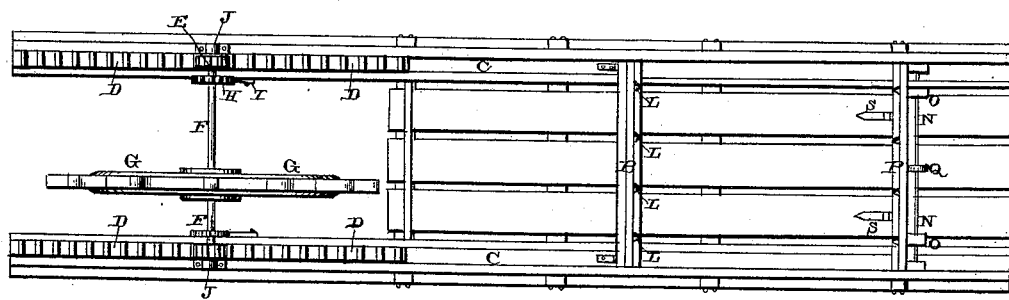
Figure 3:
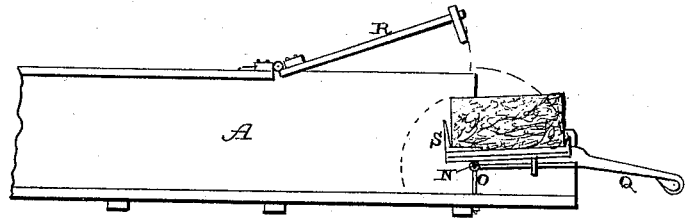

Figure 1 is a side elevation of a press embodying our invention, the side of the baling-box being removed. Fig. 2 is a plan view of the same, showing the top of the baling-box removed. Fig. 3 is a detached view showing the bale removed from the box or chamber.

A represents the baling box or chamber, and B the follower, which is connected to two bars, C, which are provided with racks D upon their outer ends to engage with the pinions E upon the operating-shaft F. Also secured to the shaft F is the operating-wheel G, provided with radiating arms or spokes, and to which additional lever-power can be applied when necessary. Upon the shaft F are placed one or more ratchets, H, with which the pawls I, secured to the frame, engage for the purpose of preventing any backward movement of the shaft F and the bars C while wires are being applied to the bale. The bearings or journals J for the shaft rise from portions of the frame which project beyond the baling-box A, and upon these bearings are placed friction-rollers $a$, upon the tops of which the bars C bear as they move back and forth. Through the head of the baling-chamber A are formed openings through which the bars C pass, and secured to the sides of the frame are friction-rollers $b$, upon which the bars C also bear. These friction-rollers decrease the amount of friction upon the bars C, and thus render the operation of the machine easier than if these bars rested upon solid bearings. Through the baling-chamber are formed suitable slots or openings, through which wires, with which the bales are bound, are passed. Through the inner side of the follower B are made grooves or openings L, through which the wires are also passed. Corresponding grooves or openings are also made through the tail-board for the passage of the wires, so that they can be freely passed around the bale, in the usual manner, for the purpose of binding it.

Passed through the side of the frame, any suitable distance above the bottom of the baling-chamber, is the rod N, and this rod passes through the parts O of the hinge by which the tail-board P is hinged. This rod N is passed through the frame above the floor, so as to cause the tail-board P to be lifted upward when it is being drawn back after the bale has been formed, as shown in Fig. 3. Also secured to this rod N is the clamping-lever Q, which catches over the top of the lid or cover R and holds it down while the bale is being compressed. Secured to the inner side of the tail-board P are the angle-irons S, which rest upon the bottom of the floor of the baling-chamber when the tail-board is in a vertical position, and over the top of the lower portion of which the outer end of the bale catches while being formed. These angle-irons are beveled upon their top, so that the bale will more readily slip upon them, and when the cover R is raised and the tail-board P drawn back these angle-irons raise the bale out of the box or chamber, as shown in Fig. 3.

Having thus described our invention, we claim—

1. The combination of the baling box or chamber with a tail-board provided with devices for catching under the bale and lifting it out of the box as the tail-board is turned backward, substantially as shown.

2. The combination of the baling box or chamber provided with a cover with the tail-board, which is hinged a suitable distance above the bottom of the baling-chamber, and which is provided with devices for catching under the bale and lifting it out of the chamber when the tail-board is turned back, substantially as described.

3. The combination of the baling box or chamber provided with a movable cover, the tail-board P, hinged above the bottom of the baling-chamber by means of the rod N, the angle-irons S, and the clamping lever, substantially as set forth.

In testimony whereof we affix our signatures in presence of two witnesses.

FRIEDRICH W. J. HOOP.
JOSEPH ISAAC.

Witnesses:
G. W. THARP,
E. A. JOHNSON.